United States Patent
Ikeda

(10) Patent No.: US 11,842,506 B2
(45) Date of Patent: Dec. 12, 2023

(54) APPARATUS, METHOD, AND STORAGE MEDIUM

(71) Applicant: CANON KABUSHIKI KAISHA, Tokyo (JP)

(72) Inventor: Satoshi Ikeda, Tokyo (JP)

(73) Assignee: CANON KABUSHIKI KAISHA, Tokyo (JP)

( * ) Notice: Subject to any disclaimer, the term of this patent is extended or adjusted under 35 U.S.C. 154(b) by 295 days.

(21) Appl. No.: 17/358,893

(22) Filed: Jun. 25, 2021

(65) Prior Publication Data

US 2022/0005213 A1 Jan. 6, 2022

(30) Foreign Application Priority Data

Jul. 2, 2020 (JP) ................................. 2020-115058

(51) Int. Cl.
| | | |
|---|---|---|
| *G06T 7/90* | (2017.01) | |
| *G06T 7/521* | (2017.01) | |
| *G06T 7/564* | (2017.01) | |
| *G06T 19/00* | (2011.01) | |

(52) U.S. Cl.
CPC ............ *G06T 7/521* (2017.01); *G06T 7/564* (2017.01); *G06T 7/90* (2017.01); *G06T 19/00* (2013.01); *G06T 2207/10024* (2013.01); *G06T 2207/10028* (2013.01); *G06T 2207/30188* (2013.01); *G06T 2219/021* (2013.01)

(58) Field of Classification Search
CPC ........... G06T 7/521; G06T 7/564; G06T 7/90; G06T 19/00; G06T 2207/10024; G06T 2207/10028; G06T 2207/30188; G06T 2219/021; G06T 2207/30156; G01B 11/2513
USPC ......................................................... 382/108
See application file for complete search history.

(56) References Cited

U.S. PATENT DOCUMENTS

| | | | | |
|---|---|---|---|---|
| 5,686,731 | A | * 11/1997 | Wiles ................. | G01N 21/9515 |
| | | | | 250/559.22 |
| 2016/0140734 | A1 | * 5/2016 | Kato ......................... | G01J 3/10 |
| | | | | 348/222.1 |
| 2019/0096057 | A1 | * 3/2019 | Allen ................. | G01N 21/8851 |
| 2021/0201513 | A1 | * 7/2021 | Steenhoek ............ | G06T 7/0004 |
| 2021/0299879 | A1 | * 9/2021 | Pinter .................... | B25J 9/1697 |

FOREIGN PATENT DOCUMENTS

| | | |
|---|---|---|
| JP | 2016038222 A | 3/2016 |
| JP | 2017036937 A | 2/2017 |

* cited by examiner

*Primary Examiner* — Ali Bayat
(74) *Attorney, Agent, or Firm* — CANON U.S.A., INC. IP Division

(57) ABSTRACT

An apparatus includes a first acquisition unit configured to acquire first image data obtained by capturing an image of an object, a second acquisition unit configured to acquire a three-dimensional shape of the object based on second image data obtained by irradiating the object with pattern light and capturing an image of the object, a determination unit configured to determine a flat area on the object based on the three-dimensional shape of the object, and an evaluation unit configured to evaluate a surface characteristic of the flat area on the object based on the first image data.

19 Claims, 15 Drawing Sheets

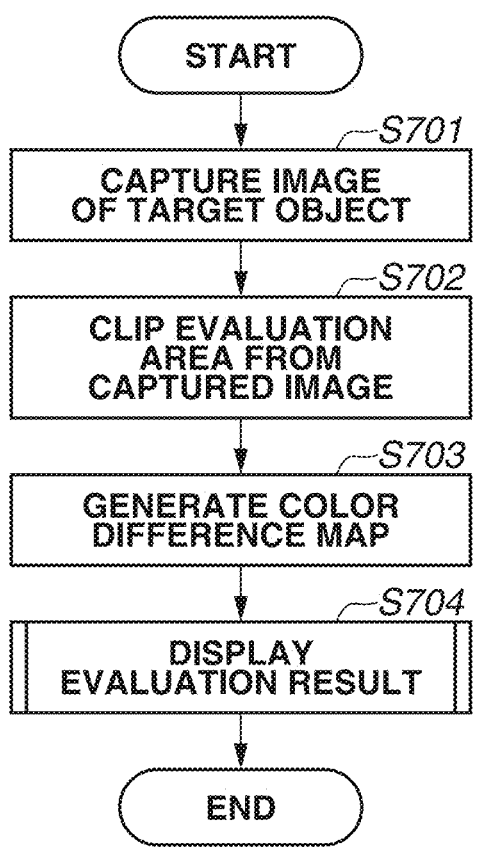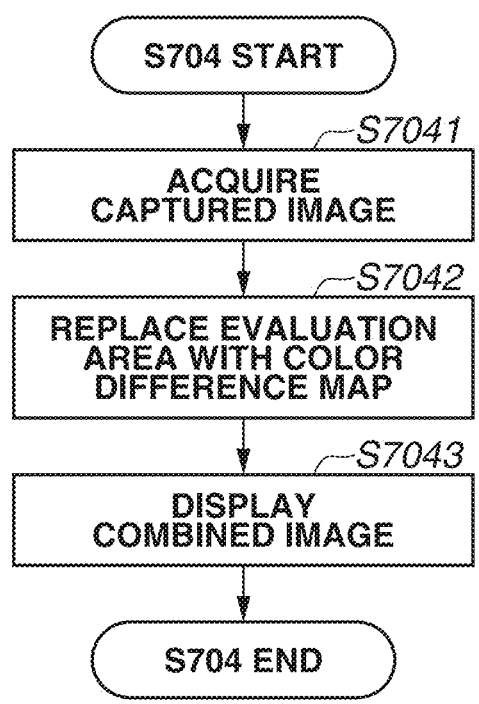

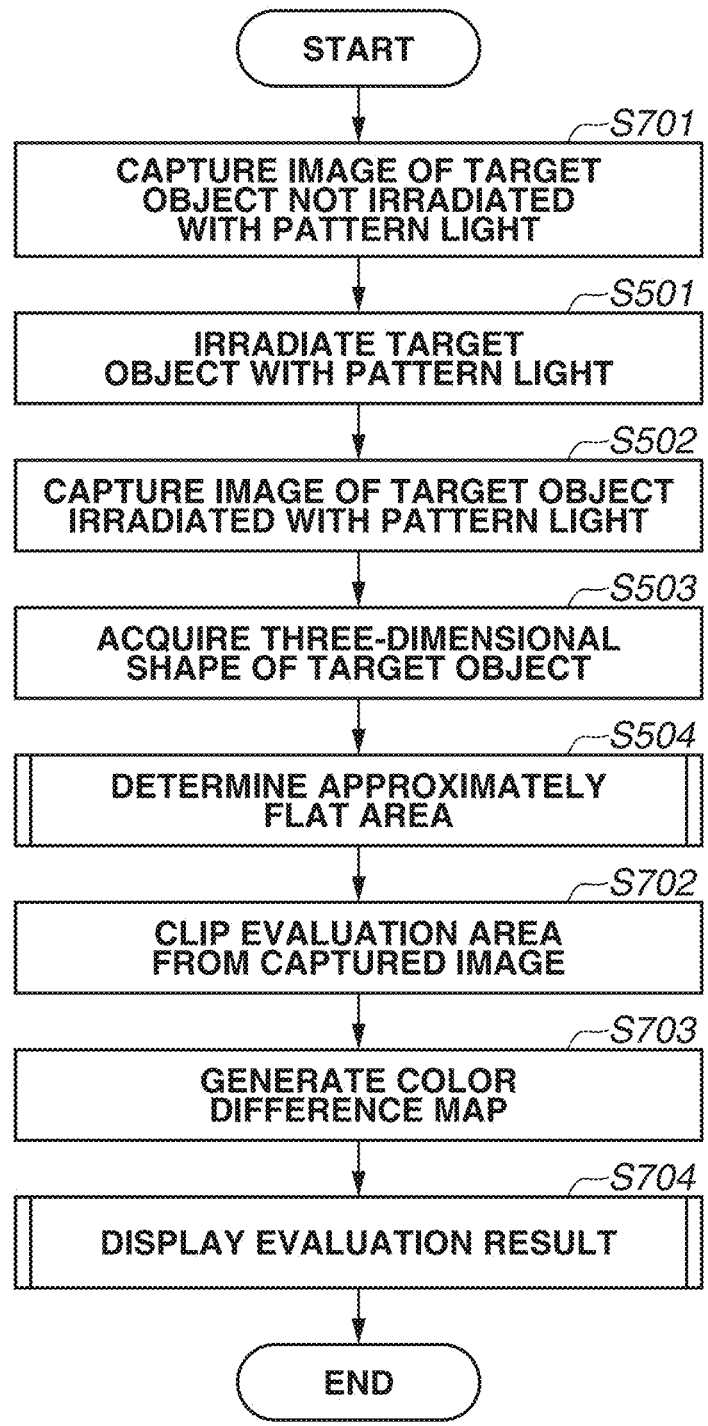

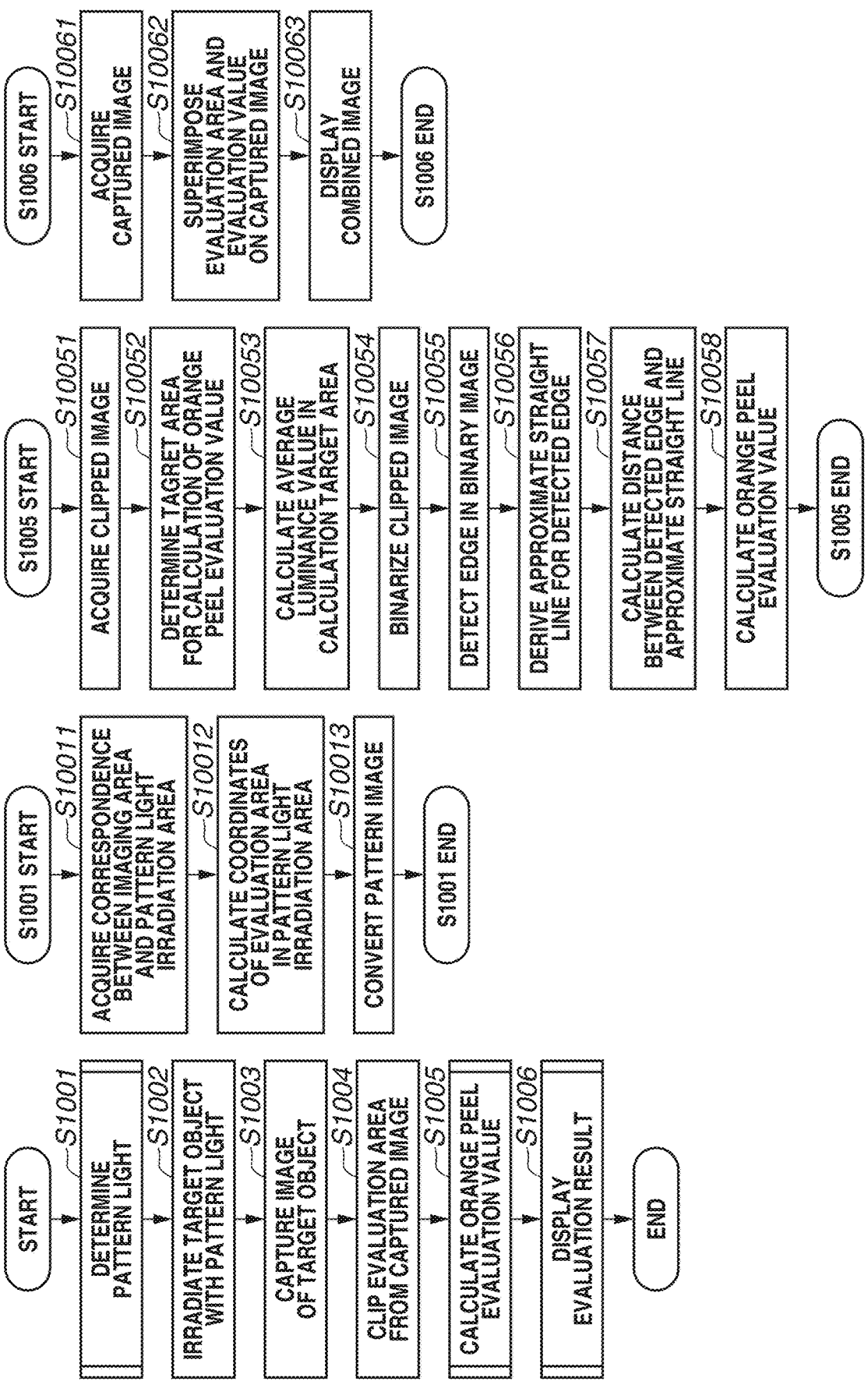

PATTERN IMAGE
BEFORE CONVERSION

PATTERN IMAGE
AFTER CONVERSION

APPARATUS, METHOD, AND STORAGE MEDIUM

BACKGROUND OF THE DISCLOSURE

Field of the Disclosure

The aspect of the embodiments relates to an image processing technique for evaluating the surface characteristics of an object.

Description of the Related Art

In recent years, digital cameras have been widely used for various applications. For example, Japanese Patent Application Laid-Open No. 2017-036937 discusses a technique for performing colorimetry of a target object having an uneven or curved surface by using a camera. Furthermore, Japanese Patent Application Laid-Open No. 2016-038222 discusses a technique for measuring the image clarity and the texture, such as orange peel, of a sample by using a spectral camera.

When such measurement as described above is performed, the measurement target object may have a complicated shape because of the design or functionality. In this case, there is an issue where, depending on the evaluation target area, the shape of the target object affects the evaluation results of the surface characteristics such as color irregularity and orange peel caused by painting, resulting in a failure to obtain a high-accuracy evaluation result.

SUMMARY OF THE DISCLOSURE

According to an aspect of the embodiments, an apparatus includes a first acquisition unit configured to acquire first image data obtained by capturing an image of an object, a second acquisition unit configured to acquire a three-dimensional shape of the object based on second image data obtained by irradiating the object with pattern light and capturing an image of the object, a determination unit configured to determine a flat area on the object based on the three-dimensional shape of the object, and an evaluation unit configured to evaluate a surface characteristic of the flat area on the object based on the first image data.

Further features of the disclosure will become apparent from the following description of exemplary embodiments with reference to the attached drawings.

BRIEF DESCRIPTION OF THE DRAWINGS

FIGS. 7A and 7B are flowcharts illustrating measurement processing.

FIG. 9 is a flowchart illustrating processing performed by the image processing apparatus.

FIGS. 10A to 10D are flowcharts illustrating another measurement processing.

DESCRIPTION OF THE EMBODIMENTS

Exemplary embodiments of the disclosure will be described below with reference to the accompanying drawings. The exemplary embodiments described below are not intended to limit the scope of the disclosure. Not all combinations of the features described in the exemplary embodiments are indispensable to the solutions for the disclosure.

A first exemplary embodiment will be described. To measure surface characteristics, such as color irregularity and orange peel, on the surface of an industrial product such as an automobile, an approximately flat area that does not have a shape such as a designed recess is specified as an evaluation area. This is because, if a designed recess is included in the evaluation area, not only color irregularity caused by painting but also a hue change caused by the recess affects the colorimetry value. This also applies to orange peel evaluation. If an area other than an approximately flat area is specified as an evaluation area, it is impossible to correctly evaluate the defocused state of light caused by minute unevenness, thereby failing to obtain an appropriate orange peel evaluation value. Thus, in the present exemplary embodiment, an approximately flat area is identified as an evaluation area on a target object. Then, a surface characteristic of the identified evaluation area is evaluated. The approximately flat area according to the present exemplary embodiment refers to an area not including a shape, such as a recess related to design or functionality, and including minute unevenness that causes color irregularity or orange peel due to painting. For example, in the case of an industrial product composed of a plurality of parts, such as an automobile, the approximately flat area refers to an area not including a border between the parts.

<Configuration of Colorimetric System>

Figure 1:
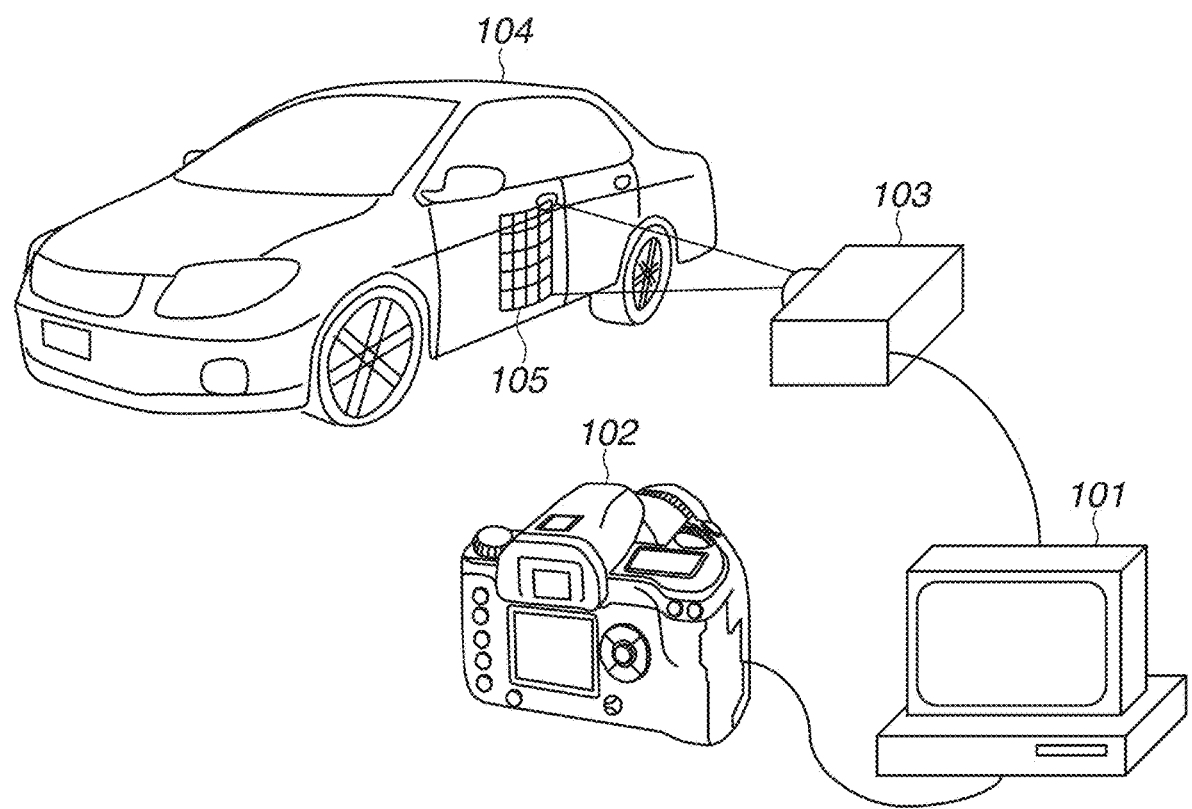
FIG. 1 is a schematic diagram illustrating a configuration of a colorimetric system including an image processing apparatus.

FIG. 1 illustrates a colorimetric system according to the present exemplary embodiment. The colorimetric system includes an image processing apparatus 101, an imaging apparatus 102, and a projection apparatus 103. The image processing apparatus 101 controls the projection apparatus 103 to irradiate a target object 104 with pattern light 105. The image processing apparatus 101 controls the imaging apparatus 102 to capture an image of the target object 104 irradiated with the pattern light 105 and, based on image data obtained by capturing the image, determines an approximately flat area on the target object 104 as an area suitable for generating a color difference map.

<Hardware Configuration of Image Processing Apparatus>

Figure 2:
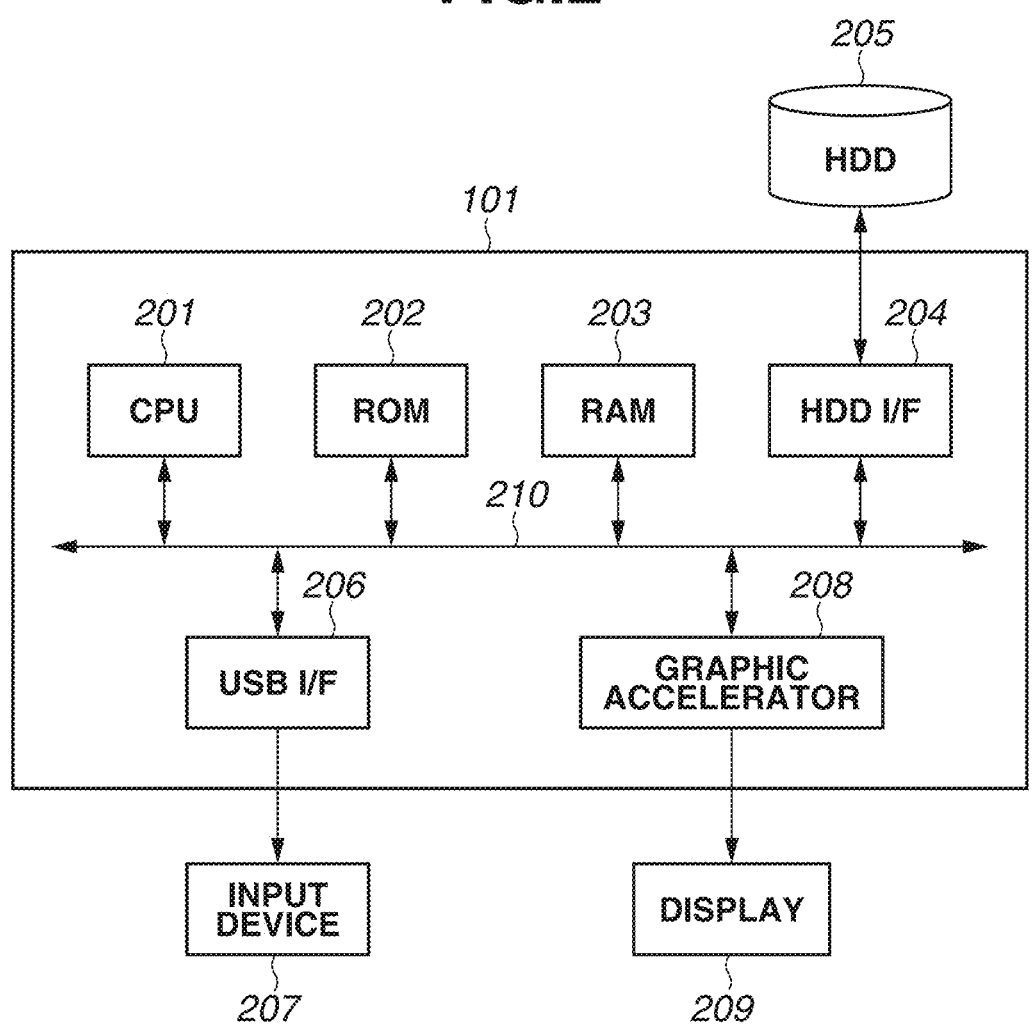
FIG. 2 is a block diagram illustrating a hardware configuration of the image processing apparatus.

FIG. 2 is a block diagram illustrating a hardware configuration of the image processing apparatus 101. A central processing unit (CPU) 201 executes an operating system (OS) and various programs stored in a read only memory (ROM) 202 or a hard disk drive (HDD) 205, using a random access memory (RAM) 203 as a work memory. The CPU 201 controls each of the components via a system bus 210 such as a peripheral component interconnect (PCI) bus. The CPU 201 accesses the HDD 205 via the system bus 210 and an HDD interface (I/F) 204. The HDD I/F 204 connects the HDD 205 or a secondary storage device such as an optical disk drive to the image processing apparatus 101. The HDD I/F 204 is a serial ATA (SATA) interface, for example. The CPU 201 can write and read data to and from the HDD 205 via the HDD I/F 204. In addition, the CPU 201 displays a user interface (UI) or a processing result on a display 209 via a graphic accelerator 208. Furthermore, the CPU 201 receives an instruction from a user via an input device 207, such as a mouse or a keyboard, connected to a USB I/F 206.

<Operation of Image Processing Apparatus>

Figure 3:
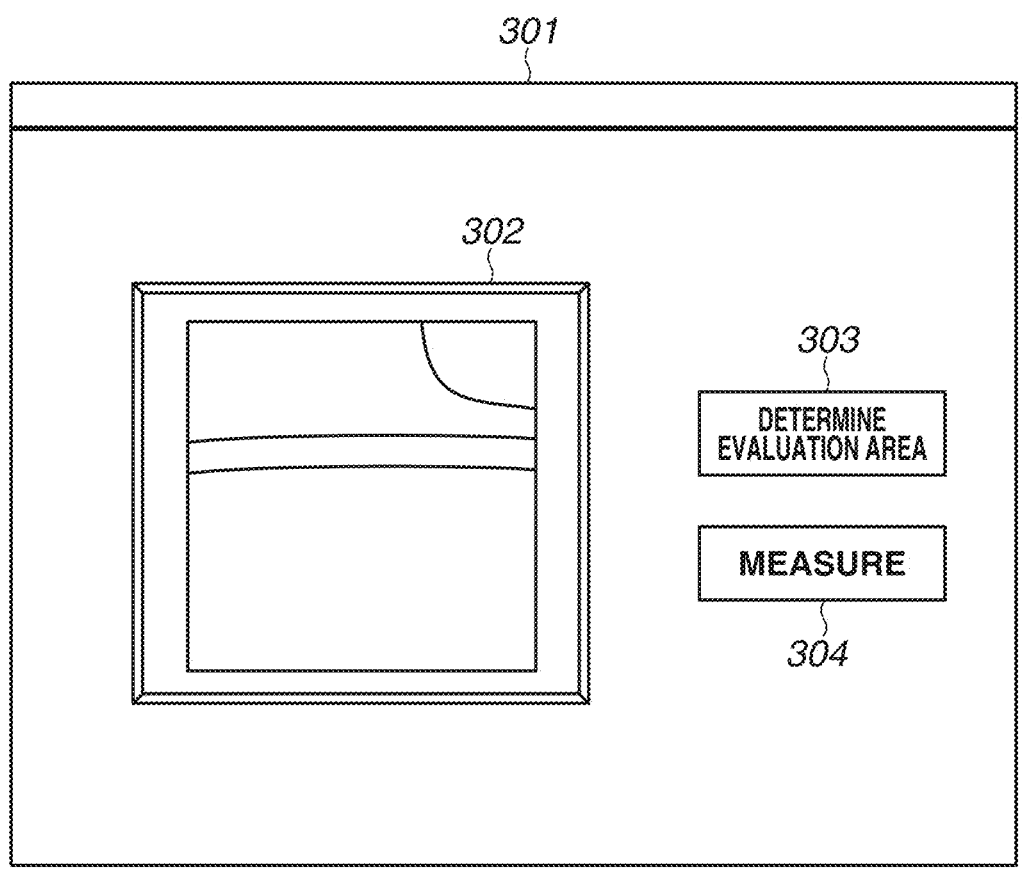
FIG. 3 is a schematic diagram illustrating an application window.

First, an image processing program stored in the HDD 205 is executed by the CPU 201 in response to an instruction input by the user via the input device 207. Then, an application window 301 illustrated in FIG. 3 is displayed on the display 209. An image display window 302 displays a captured image obtained by imaging by the imaging apparatus 102. A Determine Evaluation Area button 303 is used by the user to issue an instruction for starting processing for determining an evaluation area. After the user presses the Determine Evaluation Area button 303, a three-dimensional shape of the target object 104 is acquired using the imaging apparatus 102 and the projection apparatus 103, and an evaluation area is determined based on the three-dimensional shape of the target object 104. The Measure button 304 is used by the user to issue an instruction for starting measurement processing. After the user presses the Measure button 304, a color difference map is generated for the determined evaluation area, and the generated color difference map is displayed in the image display window 302, as a result of surface characteristic evaluation.

<Functional Configuration of Image Processing Apparatus>

Figure 4:
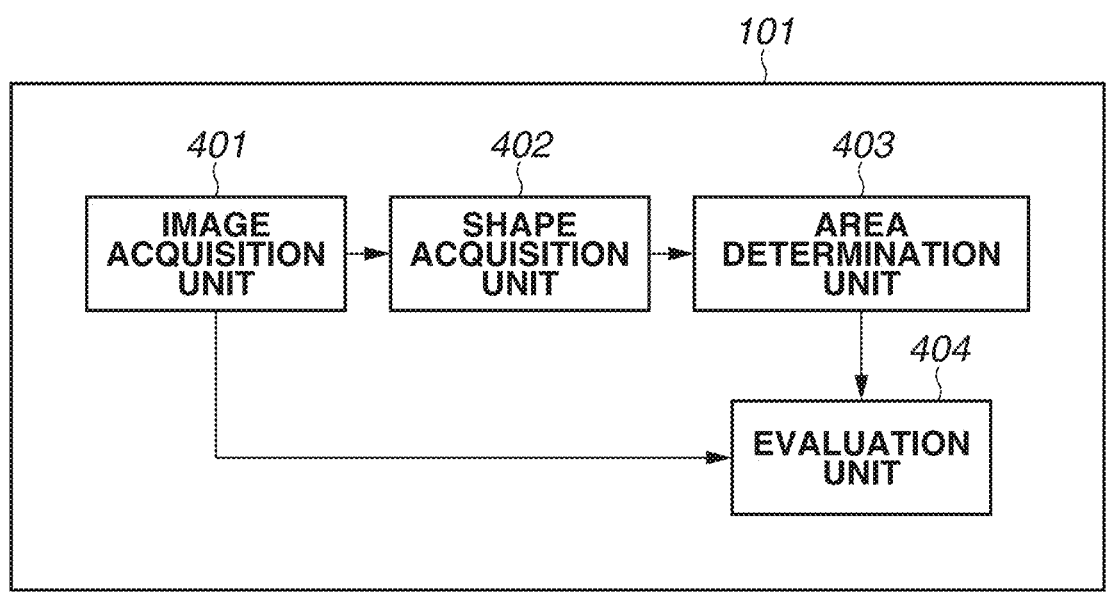
FIG. 4 is a block diagram illustrating a functional configuration of the image processing apparatus.

FIG. 4 illustrates a functional configuration of the image processing apparatus 101. The image processing apparatus 101 includes an image acquisition unit 401, a shape acquisition unit 402, an area determination unit 403, and an evaluation unit 404. The image acquisition unit 401 functions as a control unit that controls the imaging apparatus 102 and the projection apparatus 103. More specifically, the image acquisition unit 401 controls the projection apparatus 103 to irradiate the target object 104 with the pattern light 105, and controls the imaging apparatus 102 to capture an image of the target object 104 irradiated with the pattern light 105. The image acquisition unit 401 acquires, from the imaging apparatus 102, image data obtained by capturing the image. In a case where the pattern light irradiation and the imaging have been performed in advance, the image acquisition unit 401 may only acquire the image data from a storage device such as the HDD 205.

The shape acquisition unit 402 acquires a three-dimensional shape of the target object 104 based on the image data acquired by the image acquisition unit 401. A known grid projection method is used as a three-dimensional shape acquisition method according to the present exemplary embodiment. Thus, the pattern light for three-dimensional shape acquisition, i.e., the pattern light 105 with which the projection apparatus 103 irradiates the target object 104 is grid pattern light. The three-dimensional shape acquisition method is not limited to the grid projection method. Alternatively, a phase shift method using streak pattern light or other known methods may also be used. The area determination unit 403 determines an approximately flat area on the target object 104 based on the three-dimensional shape of the target object 104 acquired by the shape acquisition unit 402. The evaluation unit 404 evaluates a surface characteristic of the target object 104 by using the approximately flat area determined by the area determination unit 403, as the evaluation area. The surface characteristic to be evaluated according to the present exemplary embodiment is color irregularity caused by painting. The evaluation unit 404 functions as a color difference map generation unit that generates a color difference map containing a color difference between a predetermined reference value and the color value of each pixel in the evaluation area.

<Evaluation Area Determination Processing>

Figure 5A:
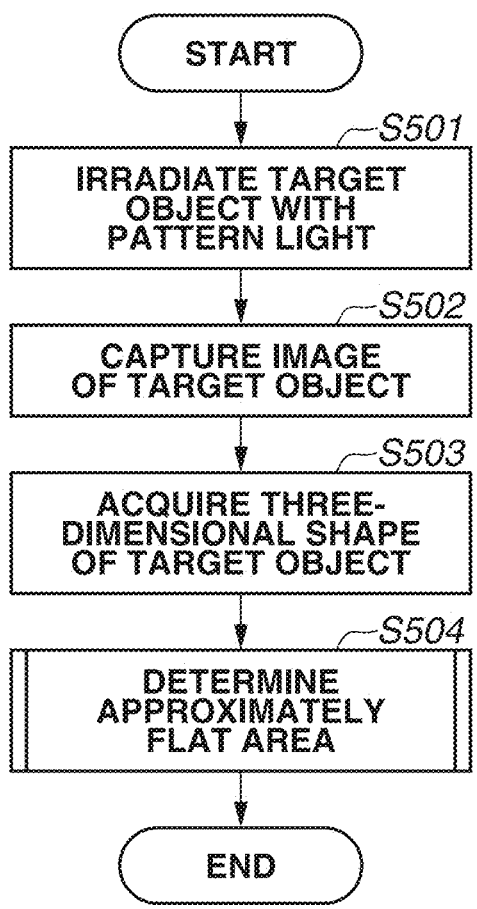
FIGS. 5A and 5B are flowcharts illustrating processing for determining an evaluation area.
Figure 5B:
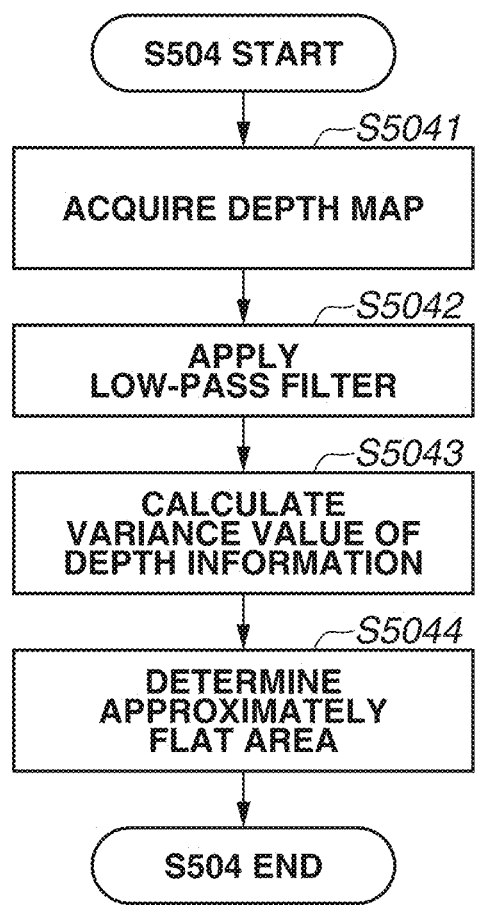

Processing for determining the evaluation area after the press of the Determine Evaluation Area button 303 will be described next with reference to the flowcharts illustrated in FIGS. 5A and 5B. The processing illustrated in the flowchart in FIG. 5A is started when the user inputs the instruction via the input device 207 and the CPU 201 receives the input instruction. The prefix S is added to each step (process) number.

In step S501, the image acquisition unit 401 controls the projection apparatus 103 to irradiate the target object 104 with the pattern light 105 for three-dimensional shape acquisition. The pattern light 105 according to the present exemplary embodiment is grid pattern light. In step S502, the image acquisition unit 401 controls the imaging apparatus 102 to capture an image of the target object 104 irradiated with the pattern light 105. In step S503, the shape acquisition unit 402 acquires a three-dimensional shape of the target object 104 based on image data obtained by capturing the image. In the present exemplary embodiment, the shape acquisition unit 402 acquires the three-dimensional shape of the target object 104 by estimating the grid phase distribution based on the known grid projection method.

In step S504, the area determination unit 403 determines an approximately flat area as the evaluation area, based on the three-dimensional shape of the target object 104. The processing in step S504 will be described in detail next with reference to the flowchart illustrated in FIG. 5B. In step S5041, the area determination unit 403 acquires a depth map for identifying the three-dimensional shape of the target object 104. The depth map is data containing the depth information $z(x, y)$ of each pixel, and is generated in step S503. Here, $(x, y)$ indicates a pixel position of the captured image, and $z(x, y)$ indicates the depth information of the pixel position.

In step S5042, the area determination unit 403 applies low-pass filter processing to the depth map. The low-pass filter processing allows the reduction of noise included in the depth information $z(x, y)$ and the identification of an approximately flat area with higher accuracy. While in the present exemplary embodiment, a 10×10 average filter is used as the low-pass filter, other low-pass filters such as a Gaussian filter may also be used. The average filter according to the present exemplary embodiment is represented by the following formula (1):

$$h(x,y)=1/10(-5 \leq x \leq 5, -5 \leq y \leq 5) \quad (1)$$

The depth information $z1(x, y)$ after the low-pass filter processing is represented by the following formula (2):

$$z1(x, y) = \sum_{s=-5}^{s=5} \sum_{t=-5}^{t=5} h(s, t) \times z(x+s, y+t) \quad (2)$$

Figure 6A:
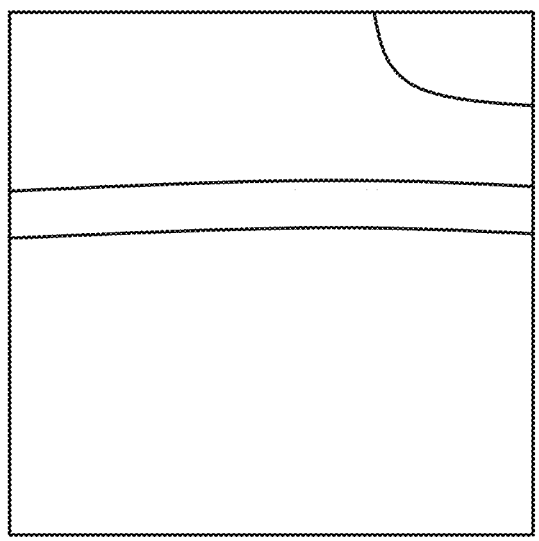
FIGS. 6A and 6B are schematic diagrams illustrating processing for calculating a variance value of depth information.

In step S5043, the area determination unit 403 calculates the variance value of the depth information z1(x, y) in each rectangular area of the depth map. Processing for calculating the variance value of the depth information z1(x, y) will be described next with reference to schematic diagrams of FIGS. 6A and 6B. FIG. 6A schematically visualizes the depth map. In FIG. 6A, shapes including a door portion and a designed bulge of the automobile (the target object 104) are expressed in the depth map in which approximately flat portions and non-approximately flat portions are mixed. In step S5043, the area determination unit 403 divides the depth map into 16 (=4×4) areas, and calculates the variance value of the depth information z1(x, y) in each division area. The variance value V(i, j) in a division area in row i and column j is represented by the following formula (3):

$$V(i, j) = \frac{1}{N} \sum_{x=(j-1)\times(\frac{W}{4})}^{x=j\times(\frac{W}{4})-1} \sum_{y=(i-1)\times(\frac{H}{4})}^{y=i\times(\frac{H}{4})-1} (z1(x, y) - z1_{ave(i,j)})^2 \quad (3)$$

Figure 6B:
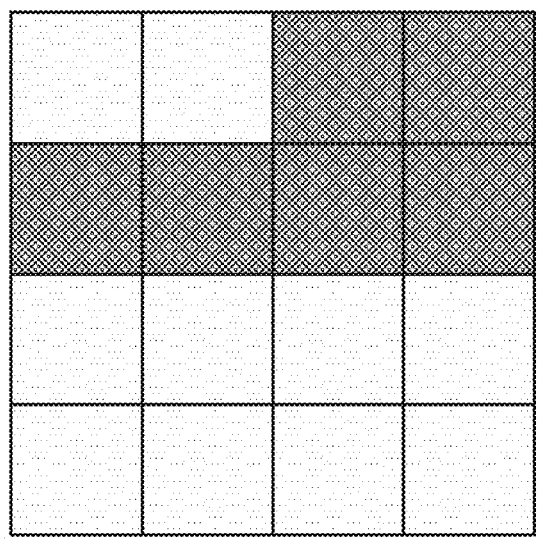

W represents the number of pixels in the horizontal direction in the depth map, and H represents the number of pixels in the vertical direction in the depth map. N represents the total number of pixels in each division area, i.e., N=H×(W/16). $z1_{ave(i,j)}$ represents the average of the depth information z1(x, y) in the division area (i, j). FIG. 6B schematically visualizes the variance value in each division area. The variance value is high in an area with a dark color. The variance value is low in an area with a light color.

In step S5044, the area determination unit 403 determines an approximately flat area based on the variance value V(i, j). In the present exemplary embodiment, the area determination unit 403 determines an area where the variance value V(i, j) of the depth information z1(x, y) is equal to or less than a predetermined threshold value, as an approximately flat area. Referring to the example illustrated in FIG. 6A, in the areas corresponding to the lower and upper left portions of the depth map, the variance value V(i, j) is small because the areas do not include a door portion or a linear bulge portion of the automobile (the target object 104). Thus, as a result of the processing in step S504, the areas at the lower and upper left portions of the image are determined to be the approximately flat area.

<Measurement Processing>

Measurement processing after the press of the Measure button 304 will be described next with reference to the flowcharts illustrated in FIGS. 7A and 7B. The processing illustrated in FIG. 7A is started when the user inputs the instruction via the input device 207 and the CPU 201 receives the input instruction. In step S701, the image acquisition unit 401 controls the imaging apparatus 102 to capture an image of the target object 104 not irradiated with the pattern light 105.

In step S702, the evaluation unit 404 clips, from the captured image, the area determined to be the approximately flat area in step S504. In the clipped image, the pixel value (R, G, B) of the pixel that is the x-th pixel in the horizontal direction and the y-th pixel in the vertical direction from the upper left position is expressed as R(x, y), G(x, y), and B(x, y).

In step S703, the evaluation unit 404 generates a color difference map based on the clipped image corresponding to the approximately flat area. The evaluation unit 404 converts the pixel values of the clipped image into L*a*b* values and calculates color differences based on the L*a*b* values. The evaluation unit 404 first normalizes each of the 8-bit values R(x, y), G(x, y), and B(x, y) into a value between 0 and 1, inclusive. The evaluation unit 404 subjects the normalized values to correction corresponding to the gamma value of the imaging apparatus 102 to calculate luminance-linear values R'(x, y), G'(x, y), and B'(x, y). The values R'(x, y), G'(x, y), and B'(x, y) are represented by the following formula (4):

$$R'(x,y)=[R(x,y)/255]^\gamma$$

$$G'(x,y)=[G(x,y)/255]^\gamma$$

$$B'(x,y)=[B(x,y)/255]^\gamma \quad (4)$$

Next, using formula (5), the evaluation unit 404 converts the values R'(x, y), G'(x, y), and B'(x, y) into tristimulus values X, Y, and Z, respectively.

$$\begin{bmatrix} X(x, y, t) \\ Y(x, y, t) \\ Z(x, y, t) \end{bmatrix} = M \begin{bmatrix} R'(x, y, t) \\ B'(x, y, t) \\ G'(x, y, t) \end{bmatrix} \quad (5)$$

Here, the color conversion matrix M is a 3×3 color conversion matrix for performing color conversion from (R, G, B) to (X, Y, Z). For example, the color conversion matrix M prescribed by ITU-R BT.709 is represented by the following formula (6):

$$M = \begin{bmatrix} 0.4124 & 0.3576 & 0.1805 \\ 0.2126 & 0.7152 & 0.0722 \\ 0.0193 & 0.1192 & 0.9505 \end{bmatrix} \quad (6)$$

The matrix represented by formula (6) may be used as the color conversion matrix M. Alternatively, the color conversion matrix M may be calculated for each imaging apparatus 102 and for each imaging condition based on the imaging result of a color chart. The evaluation unit 404 further converts the tristimulus values X, Y, and Z into L*a*b* values. Assuming that the tristimulus values X, Y, and Z of reference white color are (Xw, Yw, Zw), the L*a*b* values are calculated using the following formulas $$\left. \begin{array}{l} \text{When } X/Xw > 0.00856, \\ XRate = (X/Xw)^{1/3} \\ \text{When } X/Xw \leq 0.00856, \end{array} \right\} \quad (7)$$

$$XRate = 7.787 \times (X/Xw) + 16.0/116.0$$

$$\text{When } Y/Yw > 0.00856, \quad (8)$$
$$YRate = (Y/Yw)^{1/3}$$
$$\text{When } Y/Yw \leq 0.00856,$$
$$YRate = 7.787 \times (Y/Yw) + 16.0/116.0$$

$$\text{When } Z/Zw > 0.00856, \quad (9)$$
$$ZRate = (Z/Zw)^{1/3}$$
$$\text{When } Z/Zw > 0.00856,$$
$$ZRate = 7.787 \times (Z/Zw) + 16.0/116.0$$

-continued

When $Z/Zw > 0.00856$,
$$L^* = 116.0 \times (Z/Zw)^{1/3} - 16.0$$  (10)

When $Y/Yw \leq 0.00856$,
$$L^* = 903.29 \times (Y/Yw)$$
$$a^* = 500 \times (XRate - YRate)$$
$$b^* = 200 \times (YRate - ZRate)$$

Then, the evaluation unit 404 calculates a color difference $\Delta E$ between the calculated L*a*b* values and the reference L*a*b* values. In the present exemplary embodiment, the typical L*a*b* values of the body of the automobile, which is the target object 104, are assumed to be preset as the reference L*a*b* values. Assuming that the reference L*a*b* values are $(L^*_0, a^*_0, b^*_0)$ and the L*a*b* values at any pixel position (x, y) in the image are $(L^*_{(x, y)}, a^*_{(x, y)}, b^*_{(x, y)})$, a color difference $\Delta E_{(x, y)}$ at the pixel position (x, y) is represented by the following formula (11):

$$\Delta E_{(x,y)} = \sqrt{(L^*_{(x,y)} - L^*_0)^2 + (a^*_{(x,y)} - a^*_0)^2 + (b^*_{(x,y)} - b^*_0)^2}$$  (11)

Figure 8A:
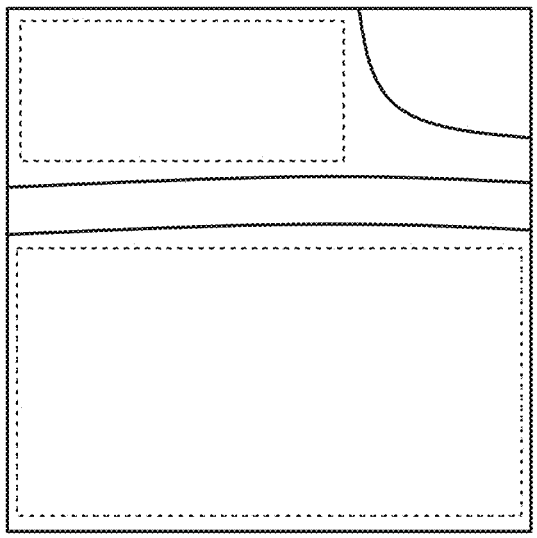
FIGS. 8A and 8B are schematic diagrams illustrating processing for displaying a color difference map.
Figure 8B:
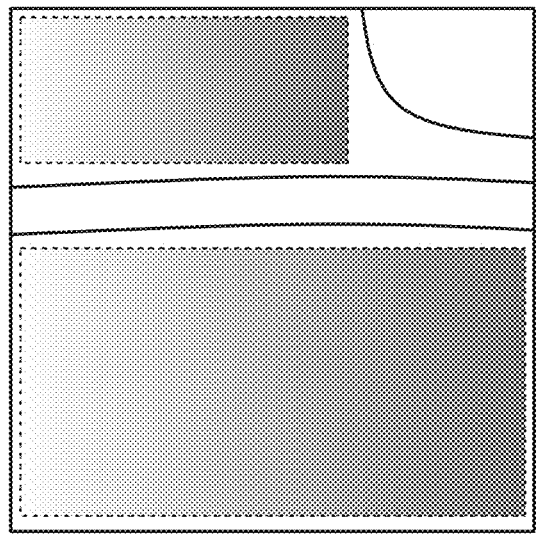

In step S704, the evaluation unit 404 displays the evaluation result on the display 209. The processing in step S704 will be described in detail next with reference to the flowchart in FIG. 7B. In step S7041, the evaluation unit 404 acquires the image data obtained by the imaging in step S701. In step S7042, the evaluation unit 404 replaces the evaluation area in the image represented by the image data, with the color difference map. FIG. 8A schematically illustrates the captured image. The areas surrounded by dotted lines indicate the area determined to be the approximately flat area in step S504. The approximately flat area is replaced with the color difference map, so that a combined image illustrated in FIG. 8B can be acquired. The color difference map is represented in such a way that an area having a smaller color difference is darker and an area having a larger color difference is brighter. In step S7043, the evaluation unit 404 presents the combined image generated in step S7042 to the user. More specifically, the evaluation unit 404 displays the combined image in the image display window 302.

Advantageous Effects

As discussed above, the image processing apparatus 101 according to the present exemplary embodiment acquires image data obtained by capturing an image of the target object 104, and acquires a three-dimensional shape of the target object 104 based on the image data. The image processing apparatus 101 determines an approximately flat area on the target object 104 based on the three-dimensional shape of the target object 104, and evaluates the surface characteristic of the approximately flat area on the target object 104. By identifying an approximately flat area suitable for surface characteristic evaluation, the influence of shapes, such as a recess and a bulge that are related to design or functionality, on the surface characteristic evaluation can be reduced. As a result, even if the target object 104 of the surface characteristic evaluation has a complicated shape, the surface characteristic of the target object 104 can be evaluated with high accuracy.

Modification Example

While in the present exemplary embodiment, the image processing apparatus 101 separately performs the processing for determining the evaluation area and the measurement processing in response to user's instructions, the image processing apparatus 101 may perform the processing in steps S501 to S504 and the processing in steps S701 to S704 as a series of processing. FIG. 9 is a flowchart illustrating the series of processing. By performing step S701 before step S501, the image processing apparatus 101 can collectively perform the imaging processing without the pattern light irradiation and the imaging processing with the pattern light irradiation.

In the first exemplary embodiment, the image processing apparatus 101 evaluates the color irregularity caused by painting, as the surface characteristic of the target object 104. In a second exemplary embodiment, the image processing apparatus 101 evaluates orange peel as the surface characteristic of the target object 104. The hardware configuration and functional configuration of the image processing apparatus 101 according to the present exemplary embodiment are similar to those according to the first exemplary embodiment, and redundant descriptions thereof will be omitted. In the present exemplary embodiment, differences from the first exemplary embodiment will be mainly described, and the same components as those according to the first exemplary embodiments are assigned the same reference numerals.

<Measurement Processing>

Measurement processing after the press of the Measure button 304 will be described next with reference to the flowchart illustrated in FIG. 10A. The processing illustrated in FIG. 10A is started when the user inputs the instruction via the input device 207 and the CPU 201 receives the input instruction.

In step S1001, the image acquisition unit 401 determines pattern light for orange peel evaluation, based on the evaluation area determined in step S504. Processing for determining the pattern light for orange peel evaluation will be described in detail below. In step S1002, the image acquisition unit 401 controls the projection apparatus 103 to irradiate the target object 104 with the pattern light for orange peel evaluation. In step S1003, the image acquisition unit 401 controls the imaging apparatus 102 to capture an image of the target object 104 irradiated with the pattern light for orange peel evaluation. Furthermore, the image acquisition unit 401 controls the imaging apparatus 102 to capture an image of the target object 104 not irradiated with the pattern light. In step S1004, the evaluation unit 404 clips the evaluation area determined in step S504, from the captured image for orange peel evaluation. In step S1005, the evaluation unit 404 calculates an orange peel evaluation value E based on the clipped image corresponding to the approximately flat area. Processing for calculating the orange peel evaluation value E will be described in detail below. In step S1006, the evaluation unit 404 displays the evaluation result on the display 209. Processing for displaying the evaluation result will be described in detail below.

<Processing for Determination of Pattern Light for Orange Peel Evaluation>

Figure 11:
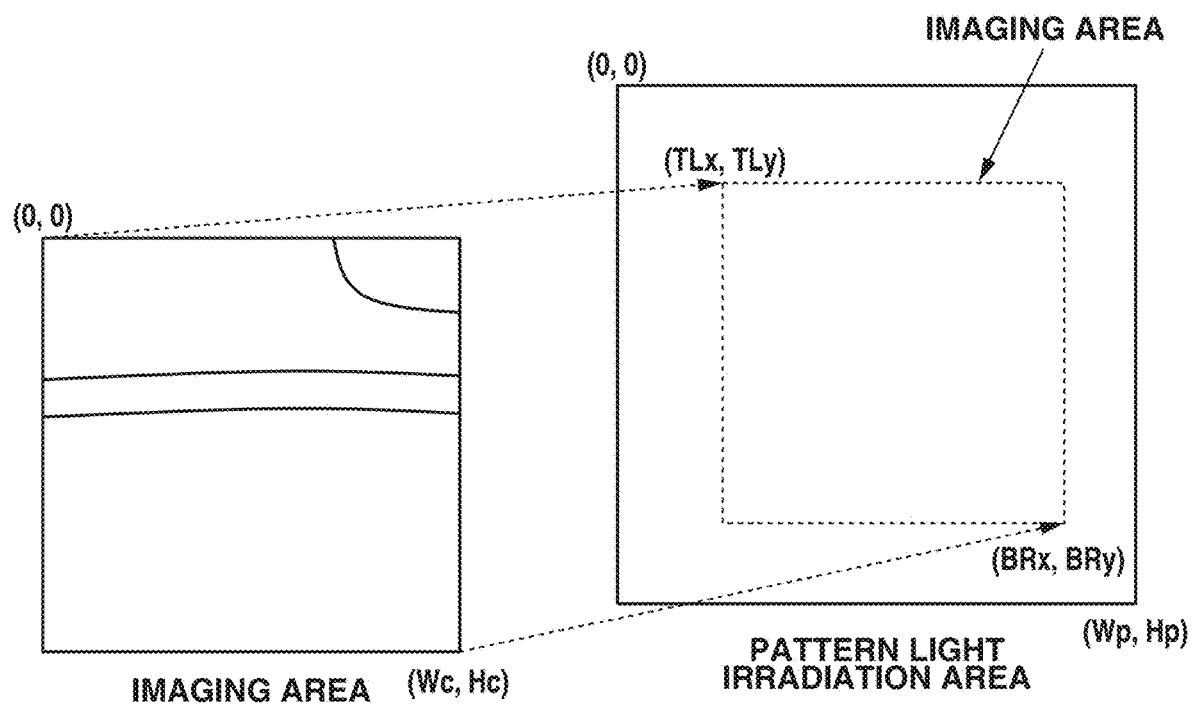
FIG. 11 is a schematic diagram illustrating a correspondence between an imaging area and a pattern light irradiation area.

The processing for determining the pattern light for orange peel evaluation will be described next with reference to the flowchart illustrated in FIG. 10B. In step S10011, the image acquisition unit 401 acquires a correspondence between an imaging area and a pattern light irradiation area. FIG. 11 schematically illustrates the correspondence between the imaging area and the pattern light irradiation area on the target object 104. The image acquisition unit 401 acquires coordinates (TLx, TLy) and (BRx, BRy) illustrated in FIG. 11, as the correspondence between the imaging area and the pattern light irradiation area. Referring to FIG. 11, the imaging area has upper left coordinates (0, 0) and lower right coordinates (Wc, Hc), and the pattern light irradiation area has upper left coordinates (0, 0) and lower right coordinates (Wp, Hp). The area surrounded by dotted lines indicates the position of the imaging area in the pattern light irradiation area. The upper left coordinates (0, 0) of the imaging area correspond to the coordinates (TLx, TLy) of the pattern light irradiation area. The lower right coordinates (Wc, Hc) of the imaging area correspond to the coordinates (BRx, BRy) of the pattern light irradiation area. The coordinates (TLx, TLy) and (BRx, BRy) are prestored in the ROM 202 as the information representing the correspondence between the imaging area and the pattern light irradiation area.

In step S10012, the image acquisition unit 401 calculates the coordinates of the evaluation area determined in step S504, in the pattern light irradiation area, based on the correspondence between the imaging area and the pattern light irradiation area. The upper left coordinates ($x_{sp}$, $y_{sp}$) and the lower right coordinates ($x_{ep}$, $y_{ep}$) of the evaluation area in the pattern light irradiation area are represented by the following formula (12):

$$x_{sp} = TLx + x_s \frac{BRy - TLy}{Hc} \quad (12)$$
$$x_{sp} = TLy + y_s \frac{BRx - TLx}{Wc}$$
$$x_{ep} = TLx + x_e \frac{BRy - TLy}{Hc}$$
$$y_{ep} = TLy + y_e \frac{BRx - TLx}{Wc}$$

Figure 12:
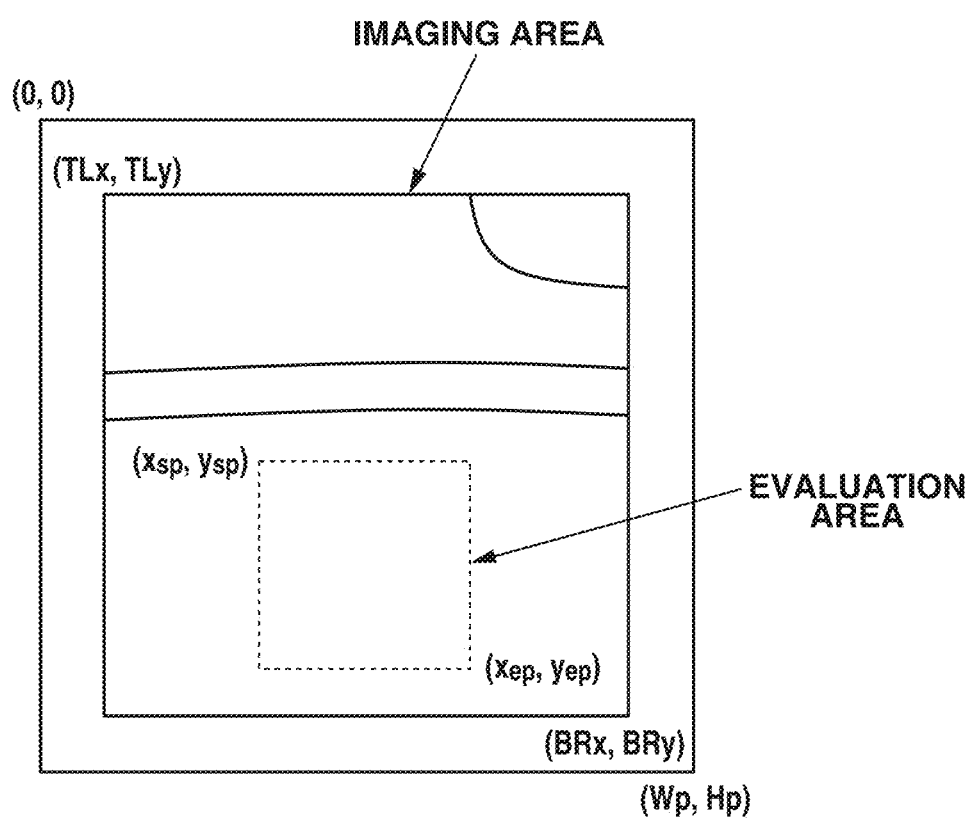
FIG. 12 is a schematic diagram illustrating an evaluation area in the pattern light irradiation area.

Here, the coordinates ($x_s$, $y_s$) indicate the upper left coordinates of the evaluation area in the imaging area, and the coordinates ($x_e$, $y_e$) indicate the lower right coordinates thereof. FIG. 12 illustrates a positional relationship between the coordinates ($x_{sp}$, $y_{sp}$) and ($x_{ep}$, $y_{ep}$) in the pattern light irradiation area. The area surrounded by dotted lines is the evaluation area.

Figure 13A:
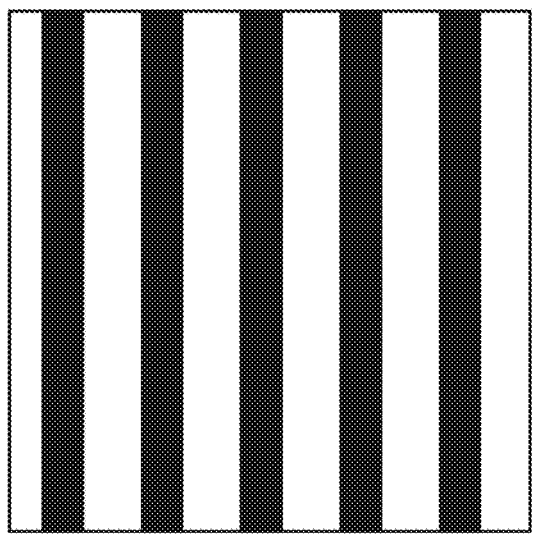
FIGS. 13A and 13B are schematic diagrams illustrating processing for converting a pattern image.
Figure 13B:
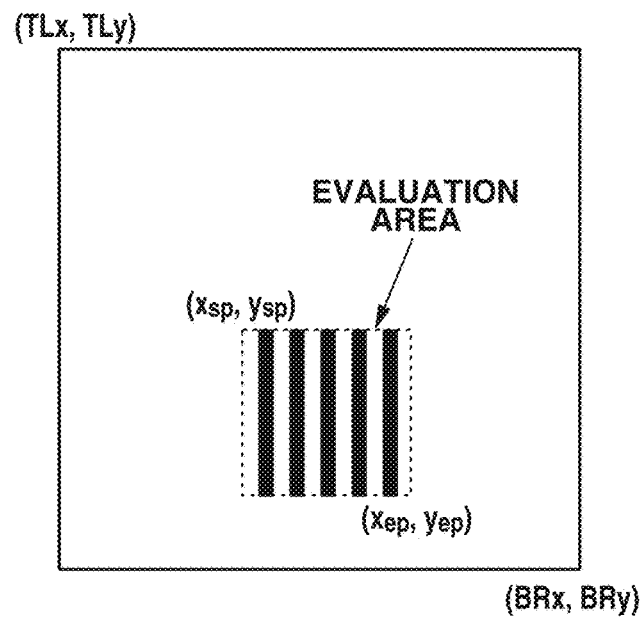

In step S10013, the image acquisition unit 401 converts a prestored pattern image based on the evaluation area defined by the coordinates ($x_{sp}$, $y_{sp}$) and ($x_{ep}$, $y_{ep}$). FIGS. 13A and 13B schematically illustrate processing for converting the pattern image. FIG. 13A illustrates the pattern image before the conversion. In the present exemplary embodiment, a rectangular wave pattern image is used to measure orange peel. FIG. 13B illustrates the pattern image subjected to the conversion based on the evaluation area. The image acquisition unit 401 first converts the size of the pattern image from the height Hc and the width Wc to a height ($y_{sp}-y_{ep}$) and a width ($x_{ep}-x_{sp}$) by using a known nearest neighbor method. The image acquisition unit 401 then moves the pattern image subjected to the conversion so that the upper left coordinates thereof is ($x_{sp}$, $y_{sp}$), thereby generating the pattern image illustrated in FIG. 13B. While in the present exemplary embodiment, the image acquisition unit 401 performs the image conversion through enlargement and reduction processing, the image acquisition unit 401 may perform rotation correction through affine transformation or projection conversion if the pattern image is inclined with respect to the evaluation area.

<Processing for Calculation of Orange Peel Evaluation Value>

Figure 14A:
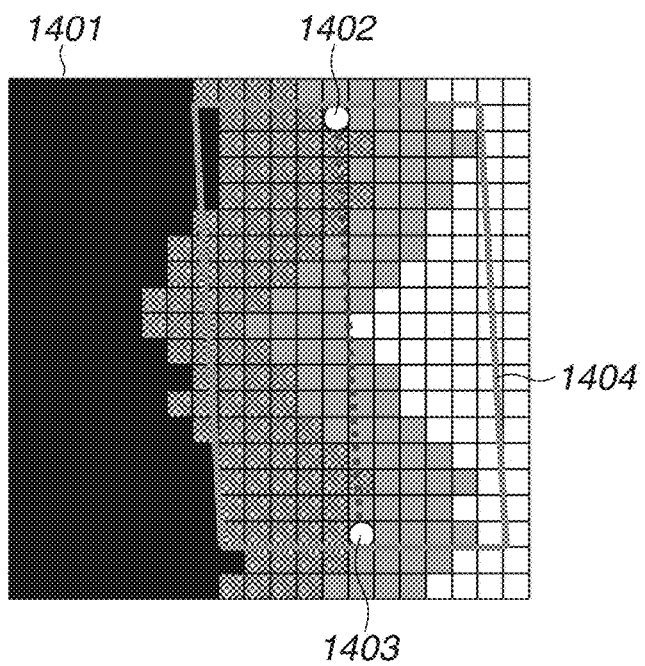
FIGS. 14A and 14B are schematic diagrams illustrating processing for calculating an orange peel evaluation value.

The processing for calculating the orange peel evaluation value E will be described next with reference to the flowchart illustrated in FIG. 10C. In step S10051, the evaluation unit 404 acquires the image clipped in step S1004. In step S10052, the evaluation unit 404 determines the target area for calculating the orange peel evaluation value E, by specifying a straight line in the clipped image. FIG. 14A schematically illustrates the target area for calculating the orange peel evaluation value E in a clipped image 1401 that is displayed in the image display window 302. The evaluation unit 404 specifies a start point 1402 and an end point 1403 of the straight line for determining the target area for calculating the orange peel evaluation value E in the clipped image 1401, based on a user's instruction. The evaluation unit 404 determines an area 1404 having a horizontal width of 2×w pixels (w is a preset value) with respect to the straight line connecting the start point 1402 and the end point 1403, as the calculation target area. While in the present exemplary embodiment, the user is prompted to specify the start point 1402 and the end point 1403 of the line, the user may be prompted to specify the four apexes of the calculation target area. Alternatively, instead of receiving the instruction from the user, the evaluation unit 404 may automatically determine the calculation target area based on the relative position between the evaluation area and the pattern image.

Figure 14B:
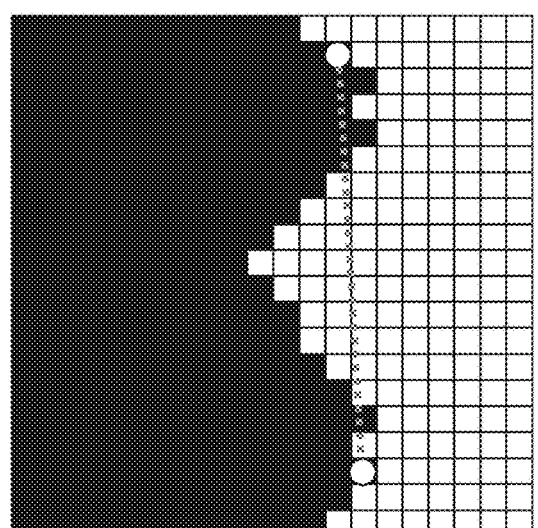

In step S10053, the evaluation unit 404 calculates the average luminance value in the calculation target area of the clipped image 1401. In step S10054, the evaluation unit 404 binarizes the pixel values of the clipped image 1401, using the calculated average luminance value as a threshold value. In step S10055, the evaluation unit 404 detects an edge in the image having the binarized pixel values. FIG. 14B illustrates the image after the binarization processing. Here, the coordinates of the start point 1402 are ($x_{st}$, $y_{st}$), and the coordinates of the end point 1403 are ($x_{ed}$, $y_{ed}$). The evaluation unit 404 changes the value of y from $y_{st}$ to $y_{ed}$, changes the value of x for each value of y, and sets a point having a different value from that of the adjacent pixel as an edge point. If there is a plurality of edge points for the same value of y, the evaluation unit 404 sets a point with a shorter distance to the straight line connecting the start point 1402 and the end point 1403, as the edge point. While in the present exemplary embodiment, the evaluation unit 404 sets a pixel having a different value from that of the adjacent pixel in the binarized image as an edge point, the evaluation unit 404 may subject the clipped image 1401 to secondary differentiation and detect a point where the output value changes from positive to negative, i.e., an inflection point, as an edge point.

In step S10056, the evaluation unit 404 derives an approximate straight line for the detected edge. In step S10057, the evaluation unit 404 calculates the distance between the edge detected in step S10055 and the approximate straight line derived in step S10056.

In step S10058, the evaluation unit 404 calculates the orange peel evaluation value E based on the distance between the detected edge and the approximate straight line. In the present exemplary embodiment, the spatial dispersion of the edge points is small when the degree of orange peel on the target object 104 is low. Thus, the evaluation unit 404 calculates the orange peel evaluation value E so that the orange peel evaluation value E is 0 when the set of edge points is located on the straight line, and increases as the deviation of the edge points from the straight line increases. More specifically, the orange peel evaluation value E is calculated by the following formula (13):

$$E = \sum_{j=y_{st}}^{y_{ed}} d_j \qquad (13)$$

Here, $d_j$ represents the distance between the approximate straight line obtained by subjecting the set of edge points to linear approximation through the least square method, and the edge point detected when the y coordinate value is j.

<Processing for Display of Evaluation Result>

Figure 15:
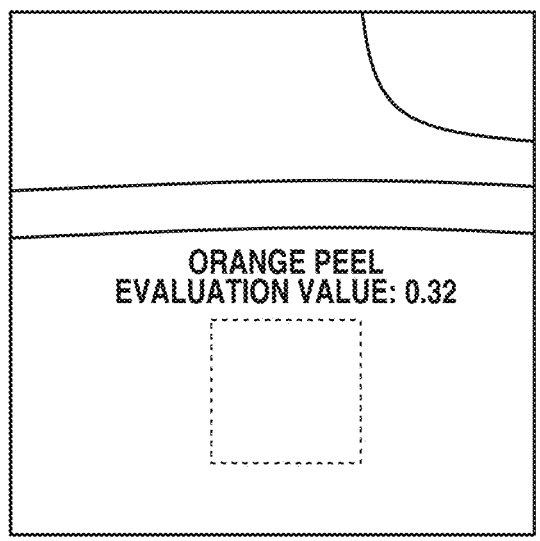
FIG. 15 is a schematic diagram illustrating a display example of an evaluation result.

The processing for displaying the evaluation result will be described next with reference to the flowchart illustrated in FIG. 10D. In step S10061, the evaluation unit 404 acquires the image data obtained by capturing the image of the target object 104 not irradiated with the pattern light in step S1003. In step S10062, the evaluation unit 404 superimposes the orange peel evaluation value E and the dotted lines representing the evaluation area on the image represented by the image data. In step S10063, the evaluation unit 404 presents the combined image generated in step S10062 to the user. More specifically, the evaluation unit 404 displays the combined image in the image display window 302. FIG. 15 illustrates a display example of the evaluation result.

Advantageous Effects

As discussed above, the image processing apparatus 101 according to the present exemplary embodiment changes the pattern light for orange peel evaluation, depending on the size and position of the evaluation area determined based on the three-dimensional shape of the target object 104. As a result, even if the target object 104 of the orange peel evaluation has a complicated shape, an appropriate position on the target object 104 can be irradiated with the pattern light for orange peel evaluation, and thus the degree of orange peel on the target object 104 can be evaluated with high accuracy.

Modification Example

While in the present exemplary embodiment, the image processing apparatus 101 evaluates the degree of orange peel on the target object 104, the image processing apparatus 101 may also perform the color irregularity evaluation according to the first exemplary embodiment at the same time. In this case, the image processing apparatus 101 displays, as the evaluation result, the color difference map together with the orange peel evaluation value on the display 209.

In the above-described exemplary embodiments, the image processing apparatus 101 acquires a three-dimensional shape of the target object 104 based on image data obtained by capturing an image of the target object 104 after painting. Alternatively, the image processing apparatus 101 can acquire a three-dimensional shape of the target object 104 based on image data obtained by capturing an image of the target object 104 before painting as long as the outline of the target object 104 is identifiable. In this case, the image processing apparatus 101 may acquire the three-dimensional shape of the target object 104 before painting and determine a flat area in advance.

The above-described exemplary embodiments can also be implemented by processing in which a program for implementing at least one function according to the above-described exemplary embodiments is supplied to a system or an apparatus via a network or a storage medium, and at least one processor in a computer of the system or the apparatus reads and executes the program. Furthermore, the exemplary embodiments can also be implemented by a circuit (e.g., an application specific integrated circuit (ASIC)) for implementing at least one function according to the above-described exemplary embodiments.

The exemplary embodiments of the disclosure makes it possible to evaluate the surface characteristics of an object with high accuracy even if the object has a complicated shape.

OTHER EMBODIMENTS

Embodiment(s) of the disclosure can also be realized by a computer of a system or apparatus that reads out and executes computer executable instructions (e.g., one or more programs) recorded on a storage medium (which may also be referred to more fully as a 'non-transitory computer-readable storage medium') to perform the functions of one or more of the above-described embodiment(s) and/or that includes one or more circuits (e.g., application specific integrated circuit (ASIC)) for performing the functions of one or more of the above-described embodiment(s), and by a method performed by the computer of the system or apparatus by, for example, reading out and executing the computer executable instructions from the storage medium to perform the functions of one or more of the above-described embodiment(s) and/or controlling the one or more circuits to perform the functions of one or more of the above-described embodiment(s). The computer may comprise one or more processors (e.g., central processing unit (CPU), micro processing unit (MPU)) and may include a network of separate computers or separate processors to read out and execute the computer executable instructions. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

While the disclosure has been described with reference to exemplary embodiments, it is to be understood that the disclosure is not limited to the disclosed exemplary embodiments. The scope of the following claims is to be accorded the broadest interpretation so as to encompass all such modifications and equivalent structures and functions.

This application claims the benefit of Japanese Patent Application No. 2020-115058, filed Jul. 2, 2020, which is hereby incorporated by reference herein in its entirety.

What is claimed is:
1. An apparatus comprising:
at least one memory that stores instructions; and
at least one processor that executes the instructions to perform:
first acquiring first image data obtained by capturing an image of an object;
second acquiring a three-dimensional shape of the object based on second image data obtained by irradiating the object with pattern light and capturing an image of the object;
determining a flat area on the object based on the three-dimensional shape of the object; and
evaluating a surface characteristic of the flat area on the object based on the first image data.

2. The apparatus according to claim 1,
wherein the second acquiring acquires depth information as information representing the three-dimensional shape of the object, and
wherein the determining determines the flat area based on the depth information.

3. The apparatus according to claim 2, wherein the determining determines the flat area based on a variance value of the depth information.

4. The apparatus according to claim 3, wherein the determining determines an area, on the object, where the variance value is equal to or less than a predetermined threshold value, as the flat area.

5. The apparatus according to claim 1, wherein the evaluating calculates a color difference between a color value of each pixel in the flat area and a reference value.

6. The apparatus according to claim 5, wherein the evaluating displays, on a display unit, a color difference map containing the color difference at each pixel in the flat area.

7. The apparatus according to claim 6, wherein the evaluating replaces an area corresponding to the flat area in an image represented by the first image data with the color difference map, and displaying the image.

8. The apparatus according to claim 1, wherein the evaluating evaluates a degree of orange peel on the flat area.

9. The apparatus according to claim 8, wherein the evaluating displays, on a display unit, an image represented by the first image data together with an orange peel evaluation value representing the degree of orange peel.

10. The apparatus according to claim 1, wherein the second acquiring acquires the three-dimensional shape of the object by using a grid projection method.

11. The apparatus according to claim 1, wherein the second acquiring acquires the three-dimensional shape of the object by using a phase shift method.

12. The apparatus according to claim 1,
wherein the first acquiring acquires the first image data obtained by capturing the image of the object after painting,
wherein the second acquiring acquires the three-dimensional shape of the object based on the second image data obtained by irradiating the object with the pattern light and capturing the image of the object before painting, and
wherein the evaluating evaluates the surface characteristic of the flat area on the object after the painting.

13. The apparatus according to claim 1,
wherein the object comprises a plurality of parts, and
wherein the flat area does not include a boundary between the parts.

14. A method comprising:
acquiring first image data obtained by capturing an image of an object;
acquiring a three-dimensional shape of the object based on second image data obtained by irradiating the object with pattern light and capturing an image of the object;
determining a flat area on the object based on the three-dimensional shape of the object; and
evaluating a surface characteristic of the flat area on the object based on the first image data.

15. The method according to claim 14, wherein the evaluating comprises:
calculating a color difference between a color value of each pixel in the flat area and a reference value, and
evaluating a degree of orange peel on the flat area.

16. The method according to claim 14, wherein the acquiring acquires the three-dimensional shape of the object by using a grid projection method or a phase shift method.

17. A non-transitory computer-readable storage medium storing instructions that, when executed by a computer, cause the computer to perform a method, the method comprising:
acquiring first image data obtained by capturing an image of an object;
acquiring a three-dimensional shape of the object based on second image data obtained by irradiating the object with pattern light and capturing an image of the object;
determining a flat area on the object based on the three-dimensional shape of the object; and
evaluating a surface characteristic of the flat area on the object based on the first image data.

18. The non-transitory computer-readable storage medium according to claim 17, wherein the evaluating comprises:
calculating a color difference between a color value of each pixel in the flat area and a reference value, and
evaluating a degree of orange peel on the flat area.

19. The non-transitory computer-readable storage medium according to claim 17, wherein the acquiring acquires the three-dimensional shape of the object by using a grid projection method or a phase shift method.

* * * * *